(12) United States Patent
Adler et al.

(10) Patent No.: US 9,053,437 B2
(45) Date of Patent: Jun. 9, 2015

(54) EXTRACTING ENTERPRISE INFORMATION THROUGH ANALYSIS OF PROVENANCE DATA

(75) Inventors: Sharon C. Adler, East Greenwich, RI (US); Francisco Phelan Curbera, Hastings on Hudson, NY (US); Yurdaer Nezihi Doganata, Chestnut Ridge, NY (US); Chung-Sheng Li, Scarsdale, NY (US); Douglas C. Lovell, Fishkill, NY (US); Axel Martens, White Plains, NY (US); Kevin Patrick McAuliffe, Yorktown Heights, NY (US); Huong Thu Morris, Ridgefield, CT (US); Nirmal K. Mukhi, Ramsey, NJ (US); Aleksander A. Slominski, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 12/265,993

(22) Filed: Nov. 6, 2008

(65) Prior Publication Data

US 2010/0114629 A1 May 6, 2010

(51) Int. Cl.
*G06Q 99/00* (2006.01)
*G06Q 10/00* (2012.01)
*G06Q 10/04* (2012.01)
*G06Q 10/06* (2012.01)

(52) U.S. Cl.
CPC ............... *G06Q 10/00* (2013.01); *G06Q 10/04* (2013.01); *G06Q 10/0633* (2013.01); *G06Q 10/0637* (2013.01)

(58) Field of Classification Search
CPC ..... G06Q 10/00; G06Q 10/04; G06Q 10/0633
USPC ......................................................... 705/7.11
See application file for complete search history.

(56) References Cited

U.S. PATENT DOCUMENTS

| | | | |
|---|---|---|---|
| 6,138,121 A | 10/2000 | Costa et al. | |
| 6,236,994 B1 | 5/2001 | Swartz et al. | |
| 6,278,977 B1 * | 8/2001 | Agrawal et al. | 705/7.27 |
| 6,604,114 B1 | 8/2003 | Toong et al. | |

(Continued)

OTHER PUBLICATIONS

"BPM for Compliance to Reduce Risk, Time, and Cost," Global 360, Optimizing Business Processes, 2005, 12 pages.

(Continued)

*Primary Examiner* — James D Nigh
(74) *Attorney, Agent, or Firm* — Nidhi Garg; Ryan, Mason & Lewis, LLP

(57) ABSTRACT

Techniques are disclosed for extracting information through analysis of provenance data. For example, a computer-implemented method of extracting information regarding an execution of an enterprise process comprises the following steps. Provenance data is generated, wherein the provenance data is based on collected data associated with an actual end-to-end execution of the enterprise process and is indicative of a lineage of one or more data items. A provenance graph is generated that provides a visual representation of the generated provenance data, wherein nodes of the graph represent records associated with the collected data and edges of the graph represent relations between the records. At least a portion of the generated provenance data from the graph is analyzed so as to extract information about the execution of the enterprise process based on the analysis.

23 Claims, 15 Drawing Sheets

(56) References Cited

U.S. PATENT DOCUMENTS

| | | | |
|---|---|---|---|
| 6,763,353 B2 | 7/2004 | Li et al. | |
| 6,920,474 B2 | 7/2005 | Walsh et al. | |
| 7,039,953 B2 | 5/2006 | Black et al. | |
| 7,143,392 B2 | 11/2006 | Li et al. | |
| 7,200,563 B1 | 4/2007 | Hammitt et al. | |
| 7,668,726 B2 | 2/2010 | Cardno et al. | |
| 2002/0165745 A1 | 11/2002 | Greene et al. | |
| 2003/0120528 A1 | 6/2003 | Kruk et al. | |
| 2003/0144868 A1* | 7/2003 | MacIntyre et al. | 705/1 |
| 2004/0107124 A1 | 6/2004 | Sharpe et al. | |
| 2004/0174397 A1* | 9/2004 | Cereghini et al. | 345/855 |
| 2005/0071207 A1 | 3/2005 | Clark et al. | |
| 2005/0210473 A1 | 9/2005 | Inchingolo et al. | |
| 2005/0278273 A1 | 12/2005 | Uthe | |
| 2006/0123022 A1 | 6/2006 | Bird | |
| 2006/0149589 A1 | 7/2006 | Wager | |
| 2006/0149759 A1 | 7/2006 | Bird et al. | |
| 2006/0184410 A1* | 8/2006 | Ramamurthy et al. | 705/8 |
| 2006/0242180 A1 | 10/2006 | Graf et al. | |
| 2006/0253477 A1 | 11/2006 | Maranhao | |
| 2006/0277523 A1 | 12/2006 | Horen et al. | |
| 2007/0088957 A1 | 4/2007 | Carson | |
| 2007/0156478 A1 | 7/2007 | Breene et al. | |
| 2007/0266166 A1 | 11/2007 | Cohen et al. | |
| 2007/0276711 A1 | 11/2007 | Shiu et al. | |
| 2007/0283417 A1 | 12/2007 | Smolen et al. | |
| 2007/0288479 A1 | 12/2007 | Howard et al. | |
| 2008/0040181 A1 | 2/2008 | Freire et al. | |
| 2008/0077530 A1 | 3/2008 | Banas et al. | |
| 2008/0082377 A1 | 4/2008 | Kennis et al. | |
| 2008/0103749 A1 | 5/2008 | Mead | |
| 2008/0103854 A1 | 5/2008 | Adam et al. | |
| 2008/0120281 A1 | 5/2008 | Marceau et al. | |
| 2008/0126042 A1 | 5/2008 | Kim | |
| 2008/0126399 A1 | 5/2008 | MacGregor | |
| 2009/0281865 A1* | 11/2009 | Stoitsev | 705/9 |
| 2009/0292818 A1 | 11/2009 | Blount et al. | |
| 2010/0082331 A1 | 4/2010 | Brun et al. | |
| 2010/0114627 A1* | 5/2010 | Adler et al. | 705/7 |
| 2010/0114628 A1* | 5/2010 | Adler et al. | 705/7 |
| 2010/0114630 A1* | 5/2010 | Adler et al. | 705/7 |

OTHER PUBLICATIONS http://theory.stanford.edu/~amitp/GameProgramming/AStarComparison.html#S2, 2009, 8 pages.

J. Freire et al., "Provenance for Computational Tasks: A Survey," IEEE Computing is Science & Engineering, May/Jun. 2008, pp. 20-30, vol. 10, No. 3.

Y.L. Simmhan et al., "A Survey of Data Provenance in e-Science," SIGMOD Record, Sep. 2005, pp. 31-36, vol. 34, No. 3.

R. Bose et al., "Lineage Retrieval for Scientific Data Processing: A Survey," ACM Computing Surveys, Mar. 2005, vol. 37, No. 1, pp. 1-28.

A-W. Scheer et al., "ARIS Architecture and Reference Models for Business Process Management," 2000, pp. 366-379.

W.M.P. Van Der Aalst et al., "Workflow Patterns," Distributed and Parallel Databases, Jul. 2003, pp. 1-70, vol. 14, No. 3.

"BPM Process Patterns," Fuego BPM White paper, http://edocs.bea.com/albsi/docs55/pdfs/BPM%20Process%20Patterns%20White%20Paper.pdf, Jan. 2006, 25 pages.

S. Ceri et al., "What You Always Wanted to Know About Datalog (and Never Dared to Ask)," IEEE Transactions on Knowledge and Data Engineering, http://doi.ieeecomputersociety.org/10.1109/69.43410, 1989, pp. 146-166, vol. 1, No. 1.

L. Moreau et al., "The Open Provenance Model," Dec. 2007, pp. 1-26.

Y.L. Simmhan et al., "A Framework for Collecting Provenance in Data Centric Scientific Workflows," Proceedings of the IEEE International Conference on Web Services (ICWS), Sep. 2006, 8 pages.

U.S. Appl. No. 12/265,975, filed in the name of Sharon C. Adler et al. on Nov. 6, 2008 and entitled "Processing of Provenance Data for Automatic Discovery of Enterprise Process Information."

U.S. Appl. No. 12/265,986, filed in the name of Sharon C. Adler et al. on Nov. 6, 2008 and entitled "Validating Compliance in Enterprise Operations Based on Provenance Data."

U.S. Appl. No. 12/266,052, filed in the name of Sharon C. Adler et al. on Nov. 6, 2008 and entitled "Influencing Behavior of Enterprise Operations During Process Enactment Using Provenance Data."

T. Gibson et al., "Application of Provenance for Automated and Research Driven Workflows," Pacific Northwest National Laboratory, 8 pages, Second International Provenance and Annotation Workshop, IPAW 2008, Jun. 17, 2008.

I. Altintas et al., "Provenance Collection Support in the Kepler Scientific Workflow System," IPAW 2006, 15 pages.

E. Petrinja et al., "A Provenance Data Management System for Improving the Product Modelling Process," Automation in Construction, 2006, 13 pages.

* cited by examiner

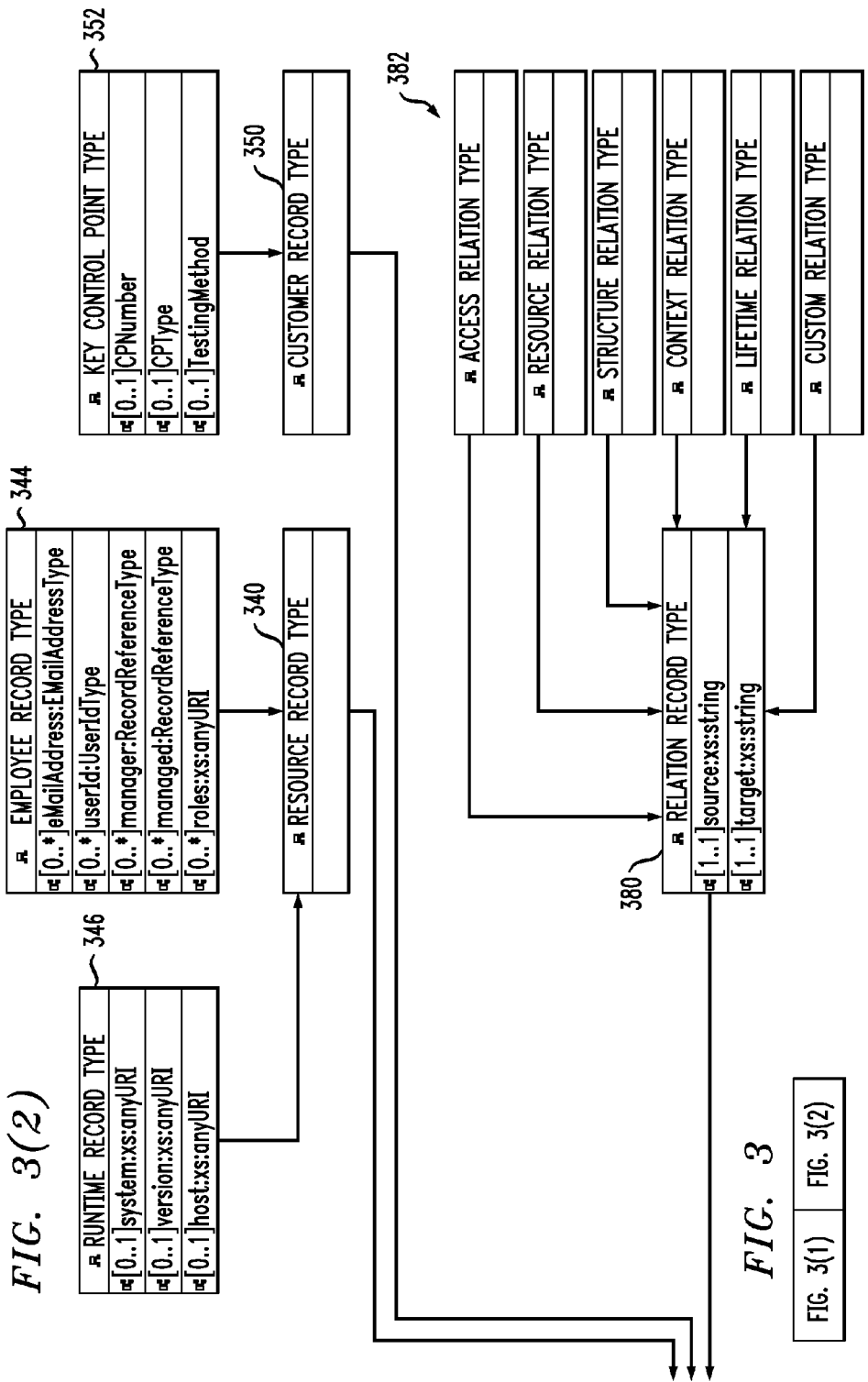

900

EXTRACTING ENTERPRISE INFORMATION THROUGH ANALYSIS OF PROVENANCE DATA

CROSS REFERENCE TO RELATED APPLICATIONS

The present application is related to the U.S. patent applications respectively identified as: (i) U.S. Ser. No. 12/265,975, entitled "Processing of Provenance Data for Automatic Discovery of Enterprise Process Information;" (ii) U.S. Ser. No. 12/265,986, entitled "Validating Compliance in Enterprise Operations Based On Provenance Data;" and (iii) U.S. Ser. No. 12/266,052, entitled "Influencing Behavior of Enterprise Operations During Process Enactment Using Provenance Data," all of which are filed concurrently herewith, and the disclosures of which are incorporated by reference herein in their entirety.

FIELD OF THE INVENTION

The present invention relates to provenance data and, more particularly, to techniques for extracting information through analysis of provenance data.

BACKGROUND OF THE INVENTION

Today's enterprise applications span multiple systems and organizations, integrating legacy and newly developed software components to deliver value to enterprise operations. However, the actual execution of enterprise applications may not be predicted in advance. This is mainly because of process dependencies on human activities and lack of automation. Nevertheless, the information about what has actually happened during the execution of an enterprise process is hidden in the process execution trace.

It would be desirable to be able to easily and effectively extract such information. However, this is not possible with existing enterprise process management systems.

SUMMARY OF THE INVENTION

Illustrative embodiments of the invention provide techniques for extracting information through analysis of provenance data.

For example, in one embodiment, a computer-implemented method of extracting information regarding an execution of an enterprise process comprises the following steps. Provenance data is generated, wherein the provenance data is based on collected data associated with an actual end-to-end execution of the enterprise process and is indicative of a lineage of one or more data items. A provenance graph is generated that provides a visual representation of the generated provenance data, wherein nodes of the graph represent records associated with the collected data and edges of the graph represent relations between the records. At least a portion of the generated provenance data from the graph is analyzed so as to extract information about the execution of the enterprise process based on the analysis.

Advantageously, embodiments of the invention provide techniques to extract information about an enterprise process from its execution traces which are captured by employing enterprise provenance graph technology. Hence, analysis of an enterprise provenance graph and its data is performed to extract information and discover knowledge about enterprise practices, policies, operational aspects, process patterns, workflow, statistics and models.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
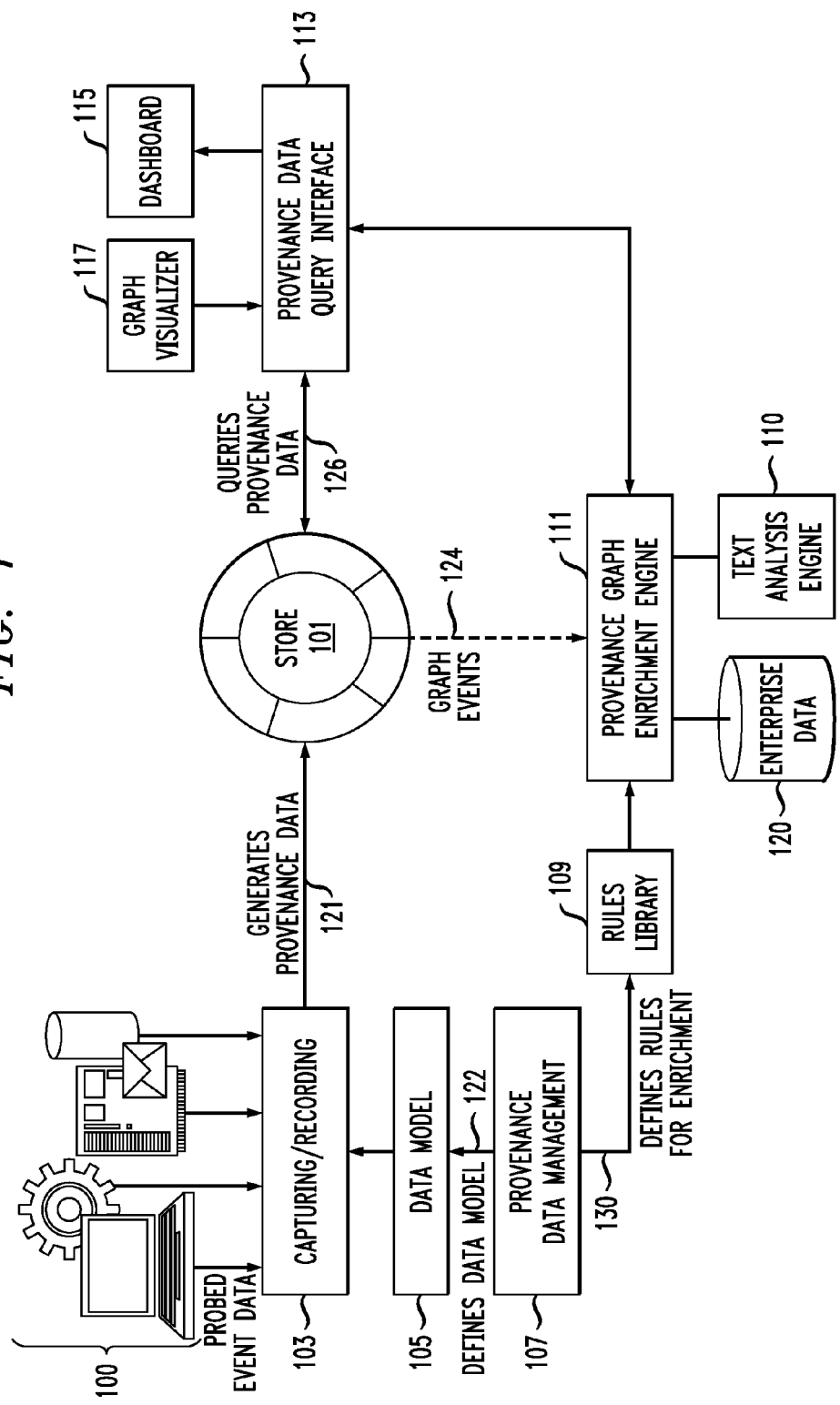
FIG. 1 illustrates a system for collecting and processing provenance data for automatic discovery of enterprise process information, according to an embodiment of the invention.

As used herein, the term "enterprise" is understood to broadly refer to any entity that is created or formed to achieve some purpose, examples of which include, but are not limited to, an undertaking, an endeavor, a venture, a business, a concern, a corporation, an establishment, a firm, an organization, or the like. Thus, "enterprise processes" are processes that the enterprise performs in the course of attempting to achieve that purpose. By way of one example only, enterprise processes may comprise business processes.

As used herein, the term "provenance" is understood to broadly refer to an indication or determination of where something, such as a unit of data, came from or an indication or determination of what it was derived from. That is, the term "provenance" refers to the history or lineage of a particular item. Thus, "provenance information" or "provenance data" is information or data that provides this indication or results of such determination. By way of one example only, enterprise provenance data may comprise business provenance data.

Principles of the invention provide a technique to extract information about an enterprise process from its execution traces which are captured by employing enterprise provenance graph technology. Hence, a focus of the invention is the analysis of an enterprise provenance graph to extract information and discover knowledge about enterprise practices, policies, operational aspects, process patterns and models.

Since the analysis is based on the recorded enterprise activities and objects, effective trace of actual enterprise execution is important. In the illustrative embodiments to be described herein, provenance technology is utilized to capture various aspects of the enterprise operations from relevant system events. In order to establish enterprise provenance, various data records that capture different aspects of the operations are collected and correlated to form a graph which is called a "provenance graph." Provenance records reflecting data objects, tasks, or processes are created by listening to the underlying events of the IT (information technology) infrastructure. The records collected about enterprise processes are connected through correlation and a representation of end-to-end process is obtained. Once a provenance graph is obtained, graph analysis techniques are used to extract information related to the enterprise practices.

One embodiment of the invention provides a sub-system that extracts common process patterns that are followed during the execution of the enterprise process. In the absence of a model or when the execution does not follow the model, extracted patterns help understand the actual process, optimize the system and compare it with existing solutions. A comprehensive list of process patterns is published in the literature and available for reuse. Once the patterns that are employed in the enterprise process are discovered, they are indexed and stored. Other than the common process pattern, embodiments of the invention allow to search for a specific process pattern. A custom pattern may be specified through a user interface and pattern search function is invoked to search for this particular pattern.

Another embodiment of the invention provides for the statistical analysis of the executed paths. Statistics of the execution traces reveal the enterprise practices generally adopted within the enterprise, exceptional situations and exception rates, performance parameters such as expected delays, throughput, etc. More importantly, graph analysis techniques help to predict how the enterprise process will evolve. This way it becomes possible to answer questions like how long a task will last to completion and what are the likely tasks and activities that will come next.

Yet another embodiment of the invention provides for the discovery of the workflow from the execution traces. The actual workflow of the execution traces may differ from the initial workflow model. The analysis reveals the discrepancies. Workflow is the depiction of a series of tasks and information flow that are executed to fulfill a requirement or a goal. It is a visual abstraction of the process.

One other embodiment provides for the discovery of a relationship between two enterprise objects that are part of the process. A methodology is described that discovers the relationship between two objects that are not directly connected or correlated within the provenance graph. This is a complex relation formed by combining the atomic relation between other objects on the path that connects the two objects. Finding relations is important to discover roles and relations and help auditing to ensure enterprise integrity.

Further, as will be explained, the provenance graph encapsulates various aspects of the enterprise and embodiments of the invention disclose a methodology to discover these aspects. These include people and roles (referred to as "organizational aspect"), the tasks and activities executed (referred to as "functional aspect"), and the data pedigree and flow (referred to as "data aspect").

Below, the detailed description, in Section I, provides illustrative embodiments of an enterprise provenance approach that provides for creation and maintenance of a provenance data model and graph. This approach is disclosed in the above-referenced U.S. patent application identified as attorney docket no. YOR920080508US1, entitled "Processing of Provenance Data for Automatic Discovery of Enterprise Process Information," filed concurrently herewith and incorporated by reference herein in its entirety. Section II of the detailed description below then provides description of the above-mentioned illustrative embodiments for extracting enterprise practices and policies through inspection and analysis of provenance data.

I. Provenance Data Model and Graph

We define an enterprise provenance approach as one that comprises capturing and managing the lineage of enterprise artifacts to discover functional, organizational, data and resource aspects of an enterprise. Examining enterprise provenance data gives insight into the chain of cause and effect relations and facilitates understanding the root causes of the resultant event.

In one embodiment of the invention, our approach comprises the following steps: (1) identifying the control points, relevant enterprise artifacts and required correlations; (2) probing the actual execution of the enterprise process to collect data; (3) correlating and enriching the collected data and the relations among them to create a provenance graph; (4) analyzing aggregated information to enable enterprise activity monitoring or to interfere with the execution by generating alerts; and (5) providing access to information stored in the graph for detailed investigation and root cause analysis.

FIG. 1 shows a system for capturing and processing provenance data for automatic discovery of enterprise process information, according to an embodiment of the invention. The enterprise process information discovery system comprises storage unit 101, multi-capturing/recording components 103, provenance data management sub-system 107, rules library 109, provenance graph enrichment engine 111, text analysis engine 110, enterprise data repository 120, provenance data query interface 113, graph visualizer 117 and dashboard 115.

The provenance data management component 107 supports the specification of the provenance data model 105, i.e., the list of enterprise objects to be captured and the level of details. It is also used to define the correlation rules between two data records. Capturing/recording components 103 are used to capture, process, and reformat application events of the underlying information system 100 (including, for example, computers, servers, repositories, email systems and other enterprise systems) and record the meta-data of enterprise operations into the provenance store. Hence, capturing/recording components 103 map the captured event data onto the data model defined (122) by provenance data management component 107. The information is then transferred (121) to storage unit 101, which is the store for provenance data.

Provenance data management component 107 generates rules (130) that are stored in rules library 109 for provenance graph enrichment engine 111. The rules define a correlation between the enterprise artifacts which is then used to connect them in the provenance graph representation.

Provenance graph enrichment engine 111 links and enriches the collected data to produce the provenance graph. To do so, provenance graph enrichment engine 111 accesses (126) the content of the provenance store 101 through provenance data query interface 113 as well as the original enterprise data. It also employs text analysis engine 110 to discover relationships among data records by analyzing the unstructured text contained in some of the data records. As an example, the analysis of e-mail may reveal that it is a rejection and is used to establish a link between the e-mail and an approval task.

The enriched enterprise data is accessed through query interface 113 and is used to display information about actual enterprise operations. This can be done in one of several ways. One way is to deploy a query into the provenance store which emits the results in real-time, feeding an existing dashboard 115 in order to display key performance indicators as an example. Secondly, a query front-end enables visualization and navigation through the provenance graph by using graph visualizer component 117.

The central component of the architecture is data store 101 where the provenance graph and the associated data records are kept. When the probed event data coming from the runtime systems 100 is transformed into provenance data by capturing/recording component 103, they are written to the store through a database connection (121). As new data are captured and recorded, provenance graph enrichment engine 111 is notified via connection 124. Provenance graph enrichment engine 111 examines the new data records and run associated rules from the rules library, utilizes the existing enterprise data as well as text analysis engine 110 to determine a possible correlation. If new data items or relations are discovered, they are written to the province store via query interface 113.

Ensuring compliance through the information system 100 requires laying out a data model that covers the relevant aspects of the enterprise operations. Creating a data model is the first step to bridge enterprise operations to information systems. The data model should support relevant and salient aspects of the enterprise.

Figure 2:
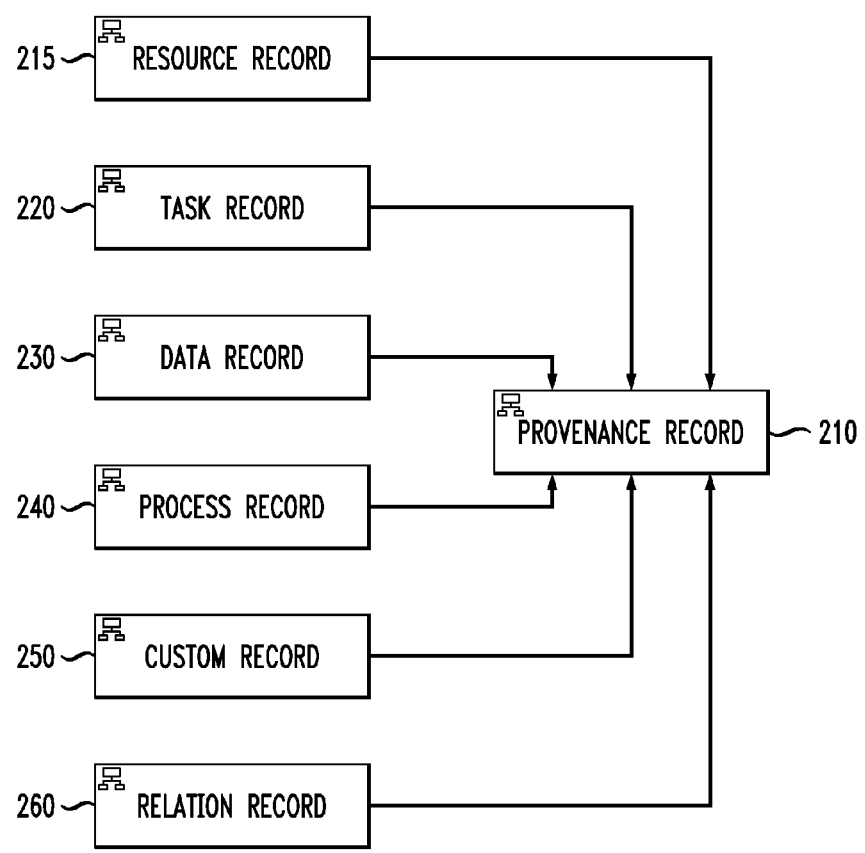
FIG. 2 illustrates a provenance record, according to an embodiment of the invention.

FIG. 2 illustrates a comprehensive, generic data model that can be extended to meet the domain specific needs. As shown, the data of enterprise artifacts stored in the provenance store, depicted as Provenance Record 210, falls into one of the following five dimensions or classes:

Data Record 230: A data record is the representation of an enterprise artifact that was produced or changed during execution of an enterprise process. Typically, those artifacts include documents, e-mails, and database records. In the provenance store, each version of such an artifact is represented separately.

Task Record 220: A task record is the representation of the execution of one particular task. Such task might be part of a formally defined enterprise process or be stand alone; it might be fully automated or manual.

Process Record 240: A process record represents one instance of a process. In automated enterprise management systems, tasks are executed by processes. Hence, each task is associated to the corresponding process record.

Resource Record 215: A resource record represents a person, a runtime or a different kind of resource that is relevant to the selected scope of enterprise provenance, e.g., as actor of a particular task.

Custom Records 250: Custom records provide the extension point to capture domain specific, mostly virtual artifacts such as compliance goals, alerts, checkpoints, etc. This will be explained in greater detail below.

These five classes of records represent the nodes of the provenance graph. To define the correlation between two records, Relation Records 260 represent the edges. These are the records generally produced as a result of relation analysis among the collected records. For simplicity of explanation, we only consider binary relations between records. However, relations between relation records are possible and such higher degree relation could be expressed in accordance with illustrative principles of the invention. Some relations are rather basic on the IT (information technology) level, such as the read and write between tasks and data. Other relations are derived from the context, such as that between manager and achieved challenge.

As mentioned above, the inventive enterprise provenance solution provides a generic data model that can be extended to meet the application domain specific needs.

Figure 3:
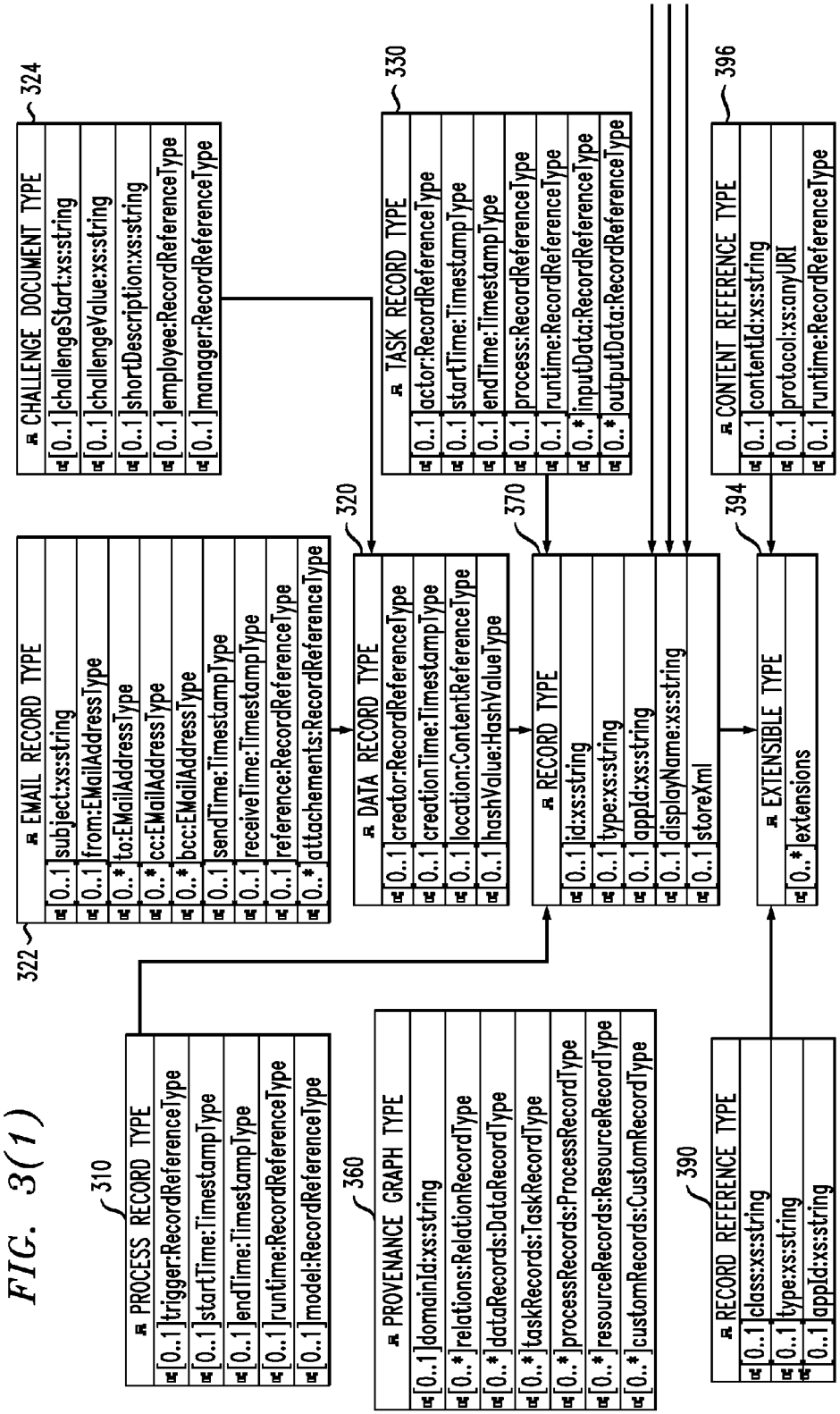
FIG. 3 illustrates a provenance data model, according to an embodiment of the invention.

FIG. 3 depicts the UML (Unified Modeling Language) representation of the provenance graph data model. Basically, the provenance graph comprises six different sets of records, namely, Process 310, Data 320, Task 330, Resource 340, Relation 380 and Custom 350 record types. Each record is an extensible XML data structure and all records share common attributes: id and type are used to identify and classify the record within the graph; the appId (application specific id) and display name refer to characteristics of the corresponding enterprise artifact. These attributes are inherited from a parent record type, RecordType 370. Data, task and process records are added to the provenance graph as the business operations are executed. Resource and custom records are often added after the fact by analytics. Those five record classes represent the nodes of the provenance graph. A semantic relation between two enterprise artifacts is expressed by an edge between the corresponding nodes materialized as a relation record. FIG. 3 shows several specializations of the basic record types. The challenge document and key control point type, however, are specific to a particular application.

ProcessRecordType 310 is differentiated from the other record types by trigger, startTime, endTime, runtime and model attributes. DataRecordType 320, on the other hand, has creator, creation Time, location, hashValue attributes. These attributes are consistent with the original purpose of having these records in the graph. In FIG. 3, two data record types are exemplified which are specific to a particular application; EmailRecordType 322 and ChallengeDocumentType 324. Email record type contains all the attributes necessary to represent an e-mail document such as subject, from, to, cc, bcc, sendTime, receiveTime, reference, attachments while ChallengeDocumentType represents an application specific document attributes.

Relations connect to provenance records. Hence, a RelationRecordType 380 has source and target attributes. Various other relation types are also depicted as extensions of RelationRecordType in 382.

In order to keep the data model generic and flexible, CustomRecordType 350 is introduced and KeyControlPointType 352 is shown as an example to a custom record type. KeyControlPointType 352 is used to relate records to a particular compliance control point. ProvenanceGraphType 360 is introduced to represent the attributes of the graph which are listed as relations, dataRecords, taskRecords, processRecords, resourceRecords, customRecords. In addition to the graph attributes, the domainId attribute is introduced to specify the particular domain for which this provenance graph is generated. EmployeeRecordType 344 contains the attributes that define an employee within the organization.

These attributes are listed as an email address, a userid, indicator of being a manager or not, the name of employee's manager and employee's role in executing the tasks. A recordType 370 is the parent of all record types from where they inherit id, type, application id, display name and xml attributes. The children of recordType 370 are ProcessRecordType 310, DataRecordType 320, TaskrecordType 330, CustomRecordType 350 and RelationRecordType 370, as mentioned previously. Following the concept of object oriented modeling, ExtensibleType 394 can be considered the ancestor of all types which has three children, namely, RecordType (370), RecordReferenceType (390) and ContentReferenceType (396). ExtensibleType passes one attribute, extensions, to the children. This attribute gives flexibility to have multiple extensions of the same model. The content and record reference types, ContentReferenceType 396 and RecordReferenceType 390 are used to refer to the location of actual data. Note that the provenance graph is a meta-information repository and the actual data resides within the enterprise at the addresses specified in record and content reference types. Resource RecordType (340) has two children. That is, there are two kinds of resource records, employees and machines. These are the entities that activate task items. In the model, employee resource is represented by EmployeeRecordType 344 and machine resources are represented as RuntimeRecordType (346).

In order to demonstrate how a provenance graph captures various aspects of the enterprise, we take a closer look at a sample scenario related to distribution of variable compensation of sales employees. Our example represents a simplified version of the actual process seen in a customer engagement. The process can be described as follows: A sales employee receives commissions for the generated revenue or profit as variable part of his income. To align these incentives specifically to the line of business, geography, and individual situation of the employees, managers create challenges. A challenge is a document that describes in detail each sales target and the associated compensation. If an employee is able to provide evidence about the achievement of a particular challenge, commission is added to his next payment statement as an incentive.

Figure 4A:
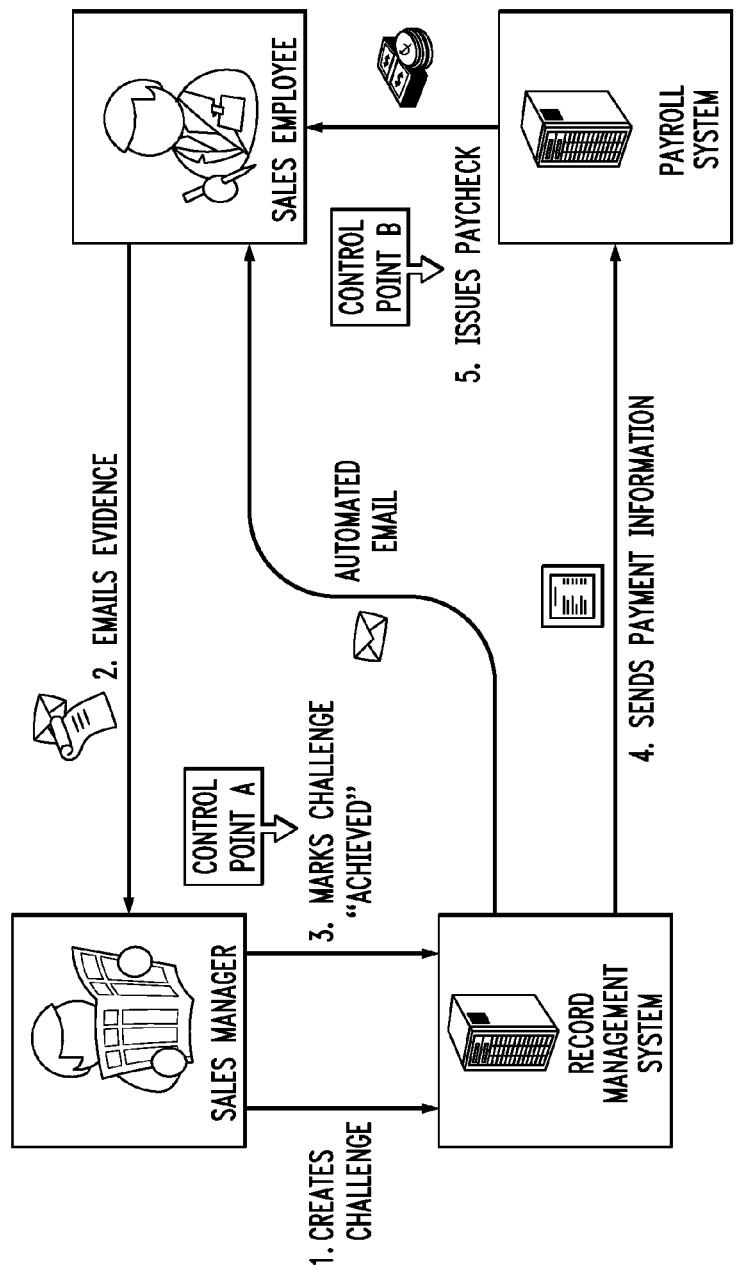
FIG. 4A illustrates an enterprise application scenario used to generate sample provenance graph, according to am embodiment of the invention.

Although from modeling point of view there is one end-to-end process instance that spans all activities from the creation of a particular challenge to the issuance of the corresponding payment statement, in practice, various distributed systems are involved in the execution of the process. Processing structured as well as unstructured documents and running formal sub-processes as well as ad-hoc tasks increases the operational complexity. FIG. 4A illustrates this scenario.

In the first step, the manager creates the challenge (1) using a Web-front-end to the central record management system. This task triggers an automated email informing the employee about the challenge. To claim the achievement, the employee has to provide evidence (2)—which can take various forms: a contract or receipt, a fax from the sales customer, a pointer to a different revenue database, etc. Typically, the evidence is available electronically and it is attached to an e-mail sent to his manager by the employee. Upon reviewing the evidence, the manager evaluates the challenge and, in case of achievement, marks its status (3). Periodically, the latest achievement data is collected and fed into the payroll system (4). Finally, the paycheck is issued to the employee (5).

In order to assure the compliance of the overall process with legal accounting regulations, various control points are introduced. Each control point reflects one locally verifiable requirement is validated today manually for a small number of sampled transactions by internal and/or external auditors. Typically, control points are established for the interaction of various systems and the verification of the control point requires the correlation of structured and/or unstructured data. In FIG. 4A, the two control points are shown. Control point A requires the manager to obtain, evaluate carefully, and maintain the evidence of any achieved challenge. Control point B requires the paycheck to reflect the accumulated commissions correctly.

To verify control point A, an auditor selects an achieved challenge, requests the evidence, and compares the sales targets with the documented achievements. This seemingly simple task has proven to be quite complicated in practice. Firstly, the evidence is not directly linked to the challenge. In some cases, it is not even stored in a central repository but kept locally by the manager. The auditor therefore has to contact the manager, and the manager has to find the right documents. Our observations have shown compliance failure rate of 70%, largely because the evidence could not be located. Also, we have observed lengthy email exchanges between an auditor and a manager until the correct evidence could be identified. As a result of this cumbersome process, only a small fraction of the total number of transactions can be sampled, which implies a high number of undetected questionable situations and possibly fraud. In addition, there had been no support available to track down the root-cause once a questionable situation was detected. This is a major drawback of the existing auditing method. To enable an enterprise to prevent future wrongdoing or simply to detect a pattern of fraudulent behavior, it is essential to answer the following question: "Why did this happen?" Our proposed enterprise provenance approach targets exactly this question.

In the given example, one might argue that the process is not well designed. But regardless how carefully an application is architected, there will always be gaps between the different systems involved, there will always be data that does not fit into predefined forms, and there will always be exceptions in the execution. Rather than requiring a full scale, heavyweight data integration, our approach focuses on the recording of meta-data of relevant objects and events into a centralized and easily accessible store with links into the original systems; the automated correlation of those meta-data to establish execution traces, versioning histories, and other relevant relations; and finally the deep analysis to detect situations after the fact, raise alerts while monitoring continuously, and even interfere with the execution to prevent compliance violations.

Figure 4B:
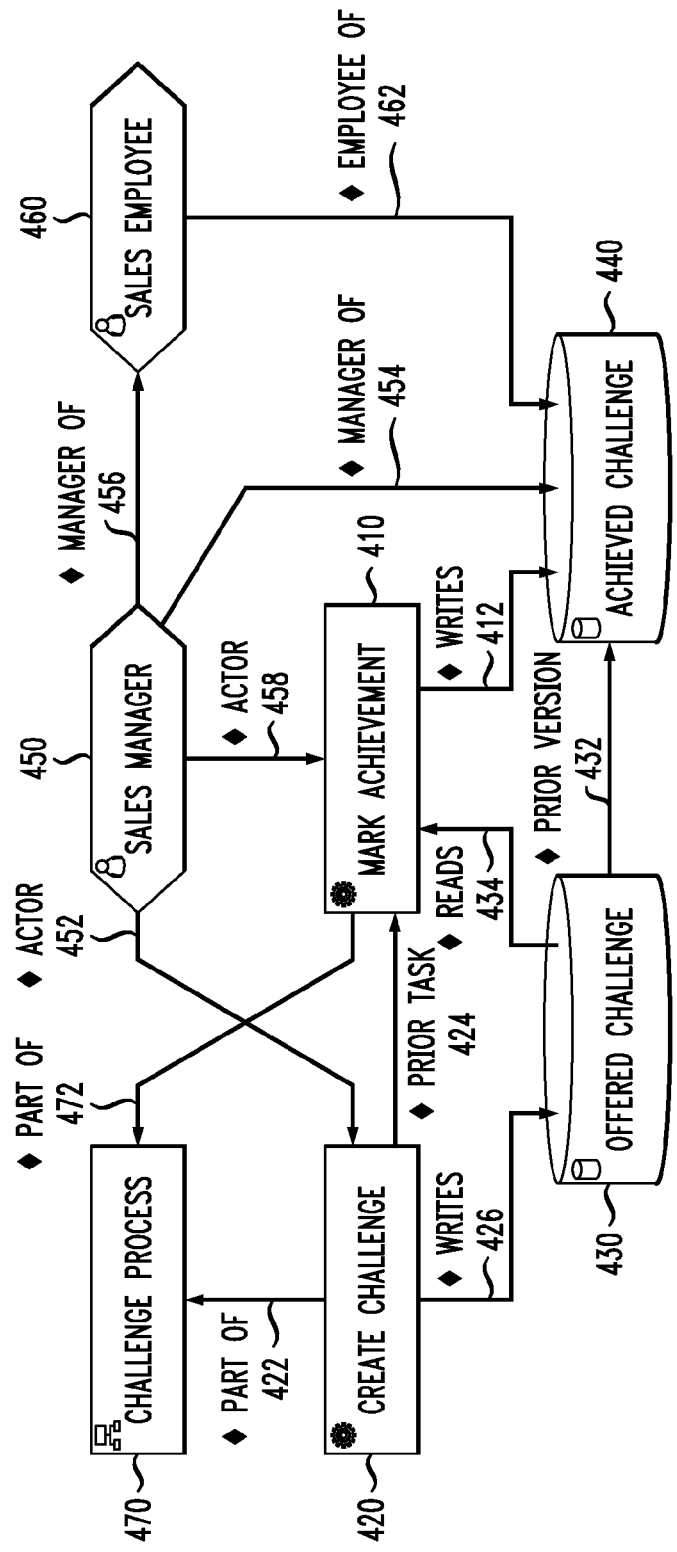
FIG. 4B illustrates a provenance graph extracted from an enterprise scenario, according to an embodiment of the invention.

FIG. 4B depicts the provenance graph for the scenario explained above. The relevant enterprise artifacts and their relations with respect to the scenario are illustrated. DataRecord types are identified by cylindrical shapes while ResourceRecord types are hexagonal, and TaskRecord types are rectangular. Thus, with respect to the scenario in FIG. 4A, the corresponding task records are represented in FIG. 4B as ChallengeProcess node 470, CreateChallenge node 420, and MarkAchievenment node 410. Further, the corresponding resource records are represented as SalesManager node 450 and SalesEmployee node 460. Corresponding data records are represented as OfferedChallenge node 430 and AchievedChallenge node 440. The diamond shapes on the edges between nodes represent the corresponding relation records: partOf 422, writes 426, priorVersion 432, reads 434, priorTask 424, actor 452, partOf 472, actor 458, managerOf 454, writes 412, managerOf 456, employeeOf 462.

Figure 4C:
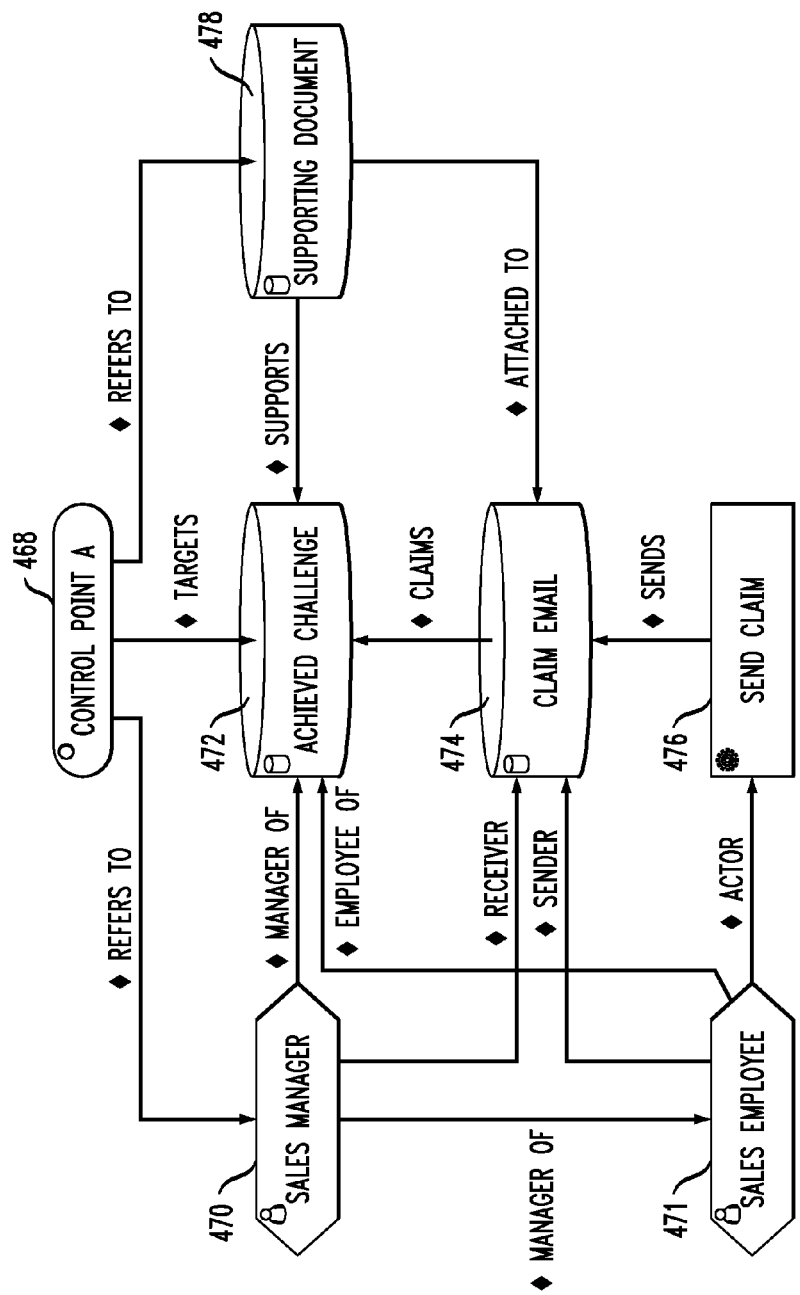
FIG. 4C illustrates a provenance sub-graph that represents a control-point, according to an embodiment of the invention.

The provenance sub-graph of FIG. 4C shows how to represent a control point (in particular, control point A shown in FIG. 4A) which indicates a requirement that sales manager must obtain and review the supporting document that supports the achieved challenge. Representing control points at the IT level enables computing compliance automatically.

More particularly, with respect to the scenario in FIG. 4A, the corresponding task record is represented in the sub-graph of the control point (468) in FIG. 4C as SendClaim node 476. Further, the corresponding resource records are represented as SalesManager node 470 and SalesEmployee node 471. Corresponding data records are represented as AchievedChallenge node 472, ClaimEmail node 474, and SupportingDocument node 478. Again, the diamond shapes on the edges between nodes represent the corresponding relation records. For the sake of simplicity, they have not been separately numbered since their specific relationships to the nodes they attach are dependent on the process being modeled (and fully understood from the scenario explained above in the context of FIG. 4A).

Figure 5:
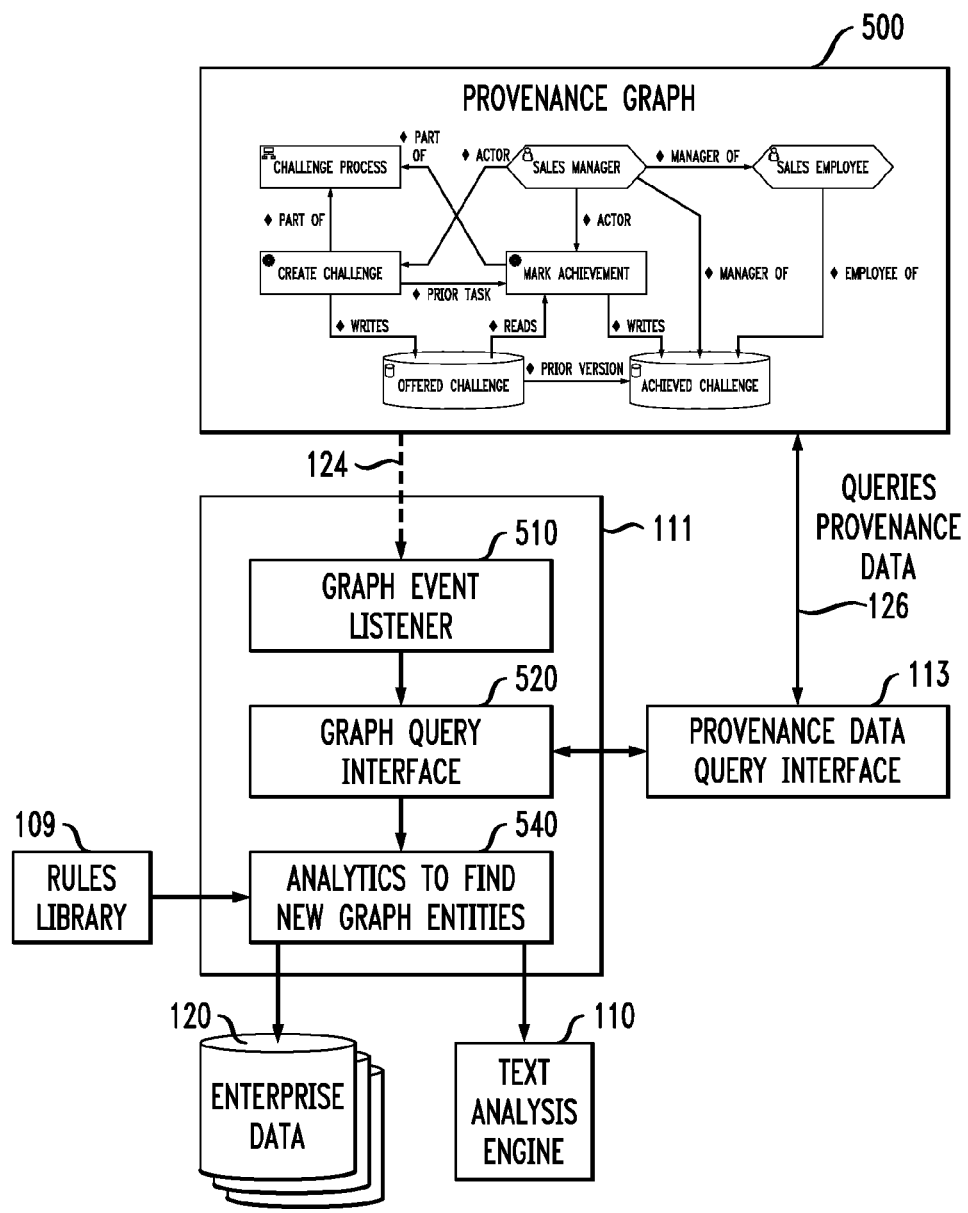
FIG. 5 illustrates a provenance graph enrichment process, according to an embodiment of the invention.

FIG. 5 shows the process of enriching the provenance graph. Provenance graph 500 is enriched by finding the relations among existing provenance records and discovering the new ones. The relations among the provenance records are defined by the rule files stored in the rule library 109. As an example, a simple rule may indicate that if the value of "From" field of an e-mail document is equal to the e-mail address of a person record, "sender" relation is set between the e-mail DataRecord and the person ResourceRecord. For every new item created in the graph, provenance graph enrichment engine 111 is notified via a graph event listener 510. The attributes of these newly created records are queried through graph query interface 520 and the received information is passed to the analytics component 540.

The main function of the analytics is to find relations or new records by computing the rules stored in the rules library 109 over the attributes of provenance records. Existing enterprise data 120 could also be used to find new relations, such as management or organizational relations. Text analysis engine 110 is employed when rules require the analysis of an unstructured content.

II. Extracting Information from Provenance Data

In the illustrative embodiments described herein, a system is described for utilizing the actual execution traces of an enterprise operation in order to extract information about the enterprise. The execution trace is captured in the form a graph from the instances of enterprise operations in a manner as described above in section I. Recall from FIG. 1 that the graph data is stored in the provenance store 101 and accessed through a query interface 113.

The enterprise information that is encapsulated by the graph is extracted by various system components. The functional descriptions of these components are given below.

Process pattern extractor: Process patterns are the pattern of activities within an organization that solve common problems. Repeatable ways of bringing together activities to solve common problems form patterns. Many known process patterns are identified and listed to help process modeling and design, for example, see W. M. P van der Aalst et al., "Workflow Patterns," Distributed and Parallel Databases, 14(3), pages 5-51, July 2003, the disclosure of which is incorporated by reference herein in its entirety. These patterns are divided in six categories.

Basic Control,
Advanced Branching,
Structural,
Multiple Instances,
State Based; and
Cancellation.

Extracting process patterns help understanding how the enterprise operations are modeled. The abstractions provided by the models help understanding the performance issues and optimize the operation end-to-end.

Statistical pattern analyzer: The way enterprise operations execute is not deterministic. In many cases, unpredictable human behavior is the cause of variations in process executions. Statistical pattern analyzer examines many execution traces for the same process and extracts statistical information about the execution patterns. Examples include the execution paths that are most frequently used, process evolution predictions, exception ratios, delay statistics, throughput, etc.

Workflow Analyzer: Workflow is a sequence of operations or tasks and information flow that are executed to achieve a goal. Execution trace contains the information about the workflow. The workflow analyzer examines the trace and predicts the workflow. A process model is extracted as a result. This way an abstraction of the execution path is obtained.

Organizational aspect analyzer: This analyzer determines the human resources behind the execution of non-automated tasks and their roles. It finds out who executed what and when.

Functional aspect analyzer: During the execution of an enterprise process, different tasks are invoked. This analyzer finds the list of executed tasks, their orders, duration of each task, and outputs of each task.

Data aspect analyzer: Identifying the enterprise artifacts and their pedigree is the purpose of the data aspect analyzer. Enterprise artifacts are documents, e-mails, forms and other structured or unstructured data that are consumed during the execution of an enterprise process.

Pattern Search: This is a special search function to search for special process patterns within the execution trace.

Relation finder: The relationship between two enterprise objects can be discovered by analyzing the paths between these objects. The relation finder looks into existing atomic relations between enterprise objects and determines the relationship between two objects where there is no direct relation.

As mentioned above, embodiments of the invention extract information about enterprise operations by examining the execution traces which are captured by creation of a provenance graph. Recall from FIG. 1 (described in section I above) that a data model captures the relevant aspects of the enterprise and that the data associated with enterprise artifacts are stored in the provenance store 101 as ProvenanceRecord 210 (FIG. 2). Recall that the data falls into one of the following five record types:

Data Record: Recall that a data record is the representation of an enterprise artifact that was produced or changed during execution of an enterprise process. Typically those artifacts include documents, e-mails, and database records. In the provenance store, each version of such an artifact is represented separately.

Task Record: Recall that a task record is the representation of the execution of one particular task. Such task might be part of a formally defined enterprise process or be stand alone, and it might be fully automated or manual.

Process Record: Recall that a process record represents one instance of a process. In automated business management systems, tasks are executed by processes. Hence, each task is associated to the corresponding process record.

Resource Record: Recall that a resource record represents a person, a runtime or a different kind of resource that is relevant to the selected scope of enterprise provenance, e.g., as actor of a particular task.

Custom Records: Recall that a custom record provides the extension point to capture domain specific, mostly virtual artifacts such as compliance goals, alerts, checkpoints, etc.

Embodiments of the invention assume that a provenance graph is created from the execution traces of enterprise operations. Recall that a sample provenance graph is depicted in FIG. 4C.

Figure 6:
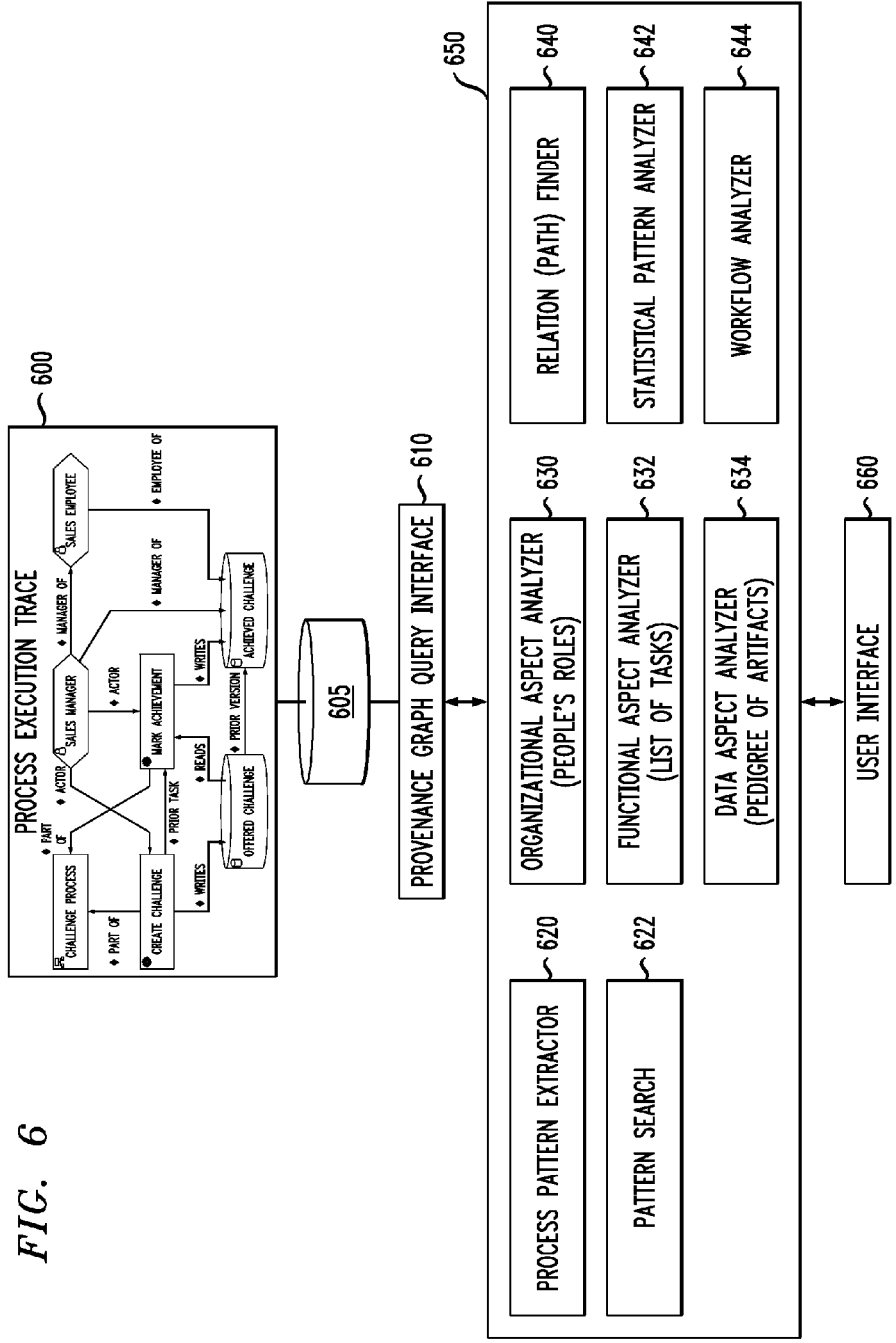
FIG. 6 illustrates an enterprise process information extraction system, according to an embodiment of the invention.

FIG. 6 depicts an enterprise process information extraction system 650. In general, system 650 sends queries to provenance data 600 (in form of a provenance graph), stored in provenance store 605, via provenance graph query interface 610. The queries are sent to retrieve information for analysis.

The components of system 650 are process pattern extractor 620, pattern search 622, organizational aspect analyzer 630, functional aspect analyzer 632, data aspect analyzer 634, relation (path) finder 640, statistical pattern analyzer 642 and workflow analyzer 644. The system also includes a user interface 660. Descriptions of these components are given above.

Process execution trace 600 is a directed graph. A number of known languages are available to query a directed graph such as a provenance graph. One example is SPARQL (Simple Protocol and RDF Query Language) for RDF (Resource Description Framework) which is a directed, labeled graph data format. In one implementation, provenance graph query interface 610 provides for a set of SPARQL interfaces to access graph information 600 in store 605. These include, for example, graph nodes, edges, their connections, paths between the nodes, etc.

As an example, organizational aspect analyzer 630 sends queries to find out people and their roles during enterprise operations. People are ResourceRecords that constitute some of the nodes of the provenance graph. People roles are related to the task they invoke. The edges that connect the people records to task records reveal various roles. Examples may include approver, sender, receiver, reviewer, etc. The functional aspect analyzer 634 sends queries via 610 to retrieve the list of task and activities.

Together with the results retrieved by functional aspect analyzer 632, organizational aspect analyzer 330 determines people's role by searching for the edges that connect people records to task records. Data aspect analyzer 634 extracts data record objects from the graph via 610 and finds their relations in time. A new DataRecord node is created for a new version of the data object on the provenance graph. Data aspect analyzer 634 determines the creation and modification dates of every data item, which tasks consume the data objects, and the people who create and modify the data. All of these functions are performed by using a query language like SPARQL, which enables retrieving various properties of the graph.

Figure 7:
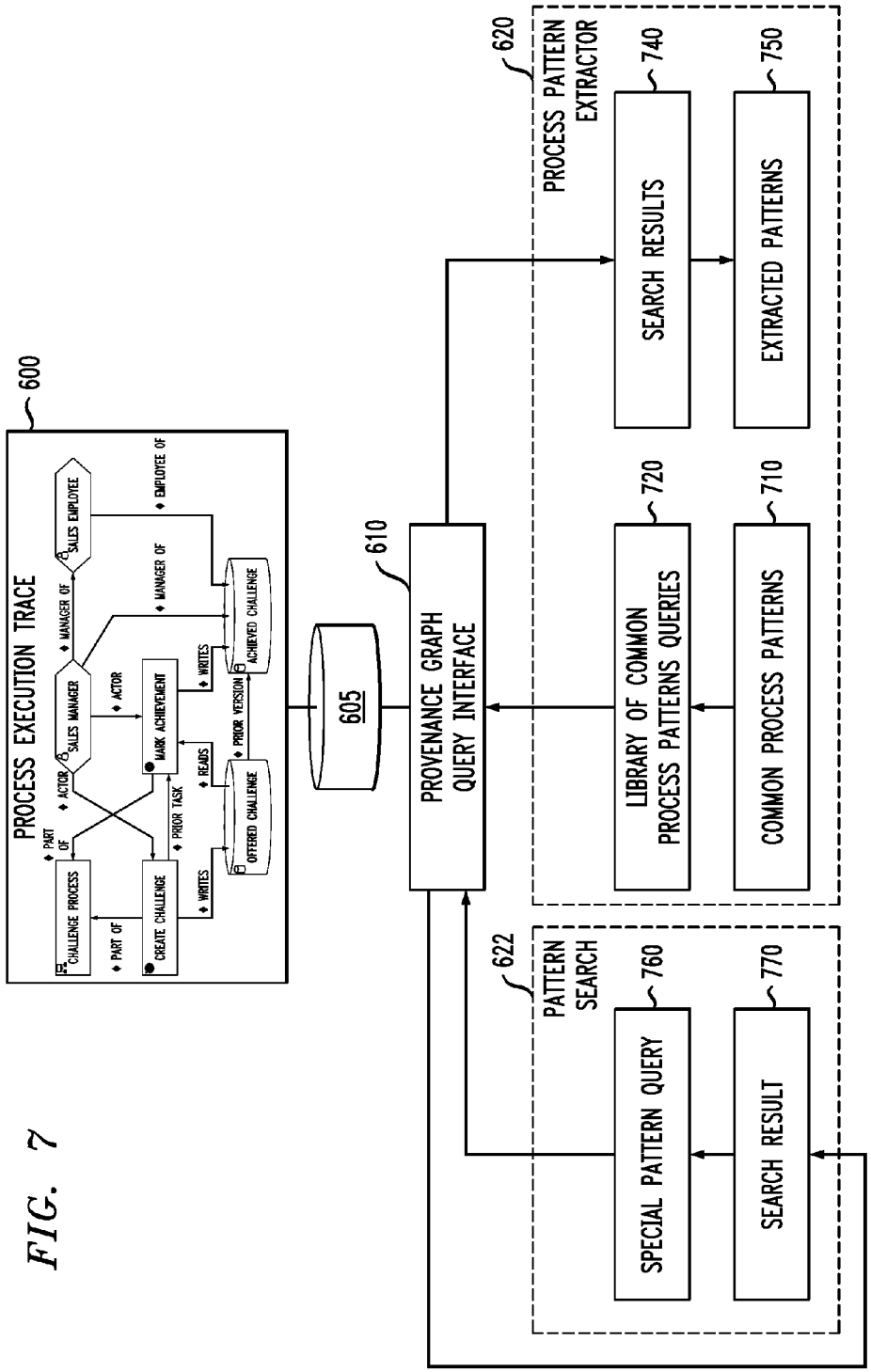
FIG. 7 illustrates process pattern extraction and pattern search components, according to an embodiment of the invention.

FIG. 7 depicts the components of process pattern extractor 620. Common process patterns are identified as reusable process design patterns. Common process pattern subcomponent 710 contains the representations of common patterns where each pattern is represented in terms of provenance graph data model. The representation is based on TaskRecord type of ProvenanceRecord as depicted in FIG. 1 and the relationship between TaskRecords. As an example, if multiple task records are merging into the same TaskRecord, then it is an indication of a "simple merge" pattern. Similarly, all patterns can be expressed in terms of the provenance graph TaskRecords and their relations. As a result, graph patterns associated with every common process pattern are formed. These graph patterns are stored in block 710 while associated queries for every pattern are kept in a library of common process pattern queries 720.

As discussed above, a common process pattern is a sub-graph where the nodes are TaskRecords and the edges are relations between the TaskRecords. An associated query for a common pattern retrieves all sub-graphs of the provenance graph with the same properties.

A common process pattern query sent by block 720 returns a list of matching patterns from the provenance graph in block 740. Common process patterns are then extracted in block 750 from the list of returned sub-graph patterns in block 740.

Execution traces 600 may contain patterns other than the common process patterns. The search function 622 is used to extract patterns that are not expressed as a common pattern. As shown in FIG. 7, special pattern query 770 is formed for the pattern to be searched for and the corresponding results are retrieved by block 770.

Figure 8:
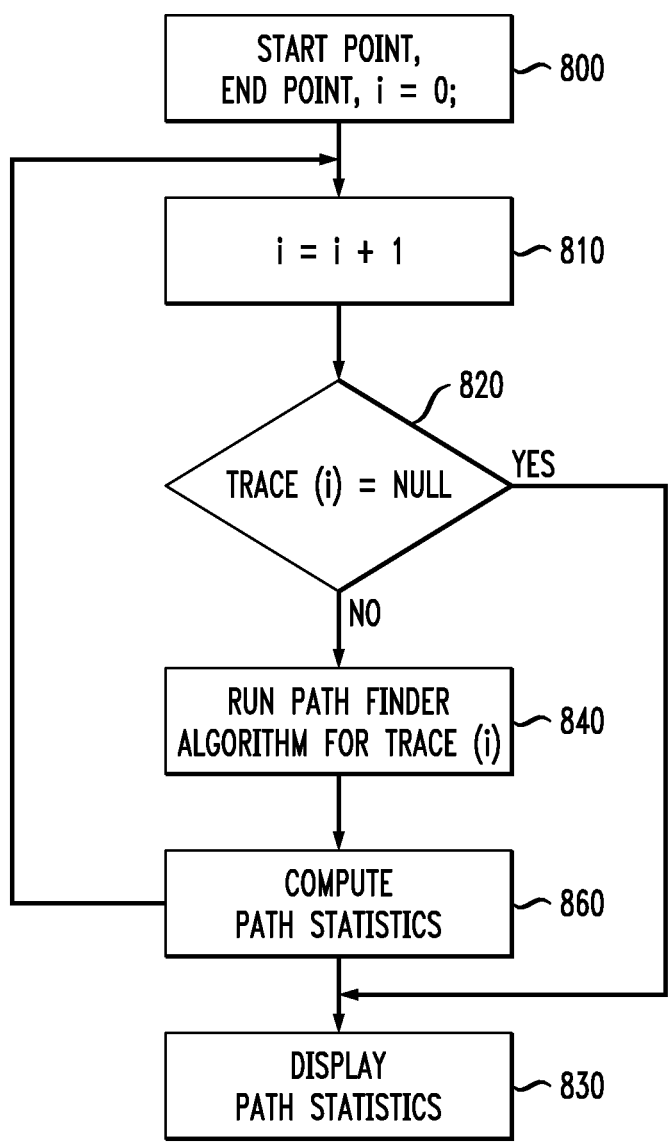
FIG. 8 illustrates a statistical pattern analysis methodology, according to an embodiment of the invention.

FIG. 8 shows how to compute the statistics of execution paths between two points in a process. The process may have many execution traces and, for statistics to be meaningful, hence it is assumed that sufficient numbers of execution traces are collected before the statistics module is run. The algorithm starts with identifying the start and end points (800). These are nodes of the provenance graph. The algorithm is run over all the traces. If the current trace is NOT null (NO in 820), then a Bayesian Learning algorithm 840 is run between the start and end nodes. Existing execution traces are used to create a Markovian model for the provenance graph. The Markovian model assigns probabilities for each node and transitions between the nodes. The learning algorithm is based on the statistics of transitions between nodes and the average time spent in each node. If the trace is null and thus no other traces are available to analyze (YES in 820), then the available statistics are displayed (830). A known path finding algorithm can be employed.

Once the path is found, path statistics are re-computed (860) and the next trace (810) is examined. Hence, every new trace contributes to the path statistics in step 860. Path statistics include standardized regression coefficients predicting one variable from another. Once the statistical model is computed for a path, then this model is used for predicting how the enterprise process will evolve. As an example, from the statistical model, one can predict what the next execution step will be. Well-known machine techniques are available for analyzing a path and computing path statistics by using Bayesian Network Model (see Machine Learning, Tom Mitchell, McGraw Hill, 1997, the disclosure of which is incorporated by reference herein in its entirety).

Figure 9:
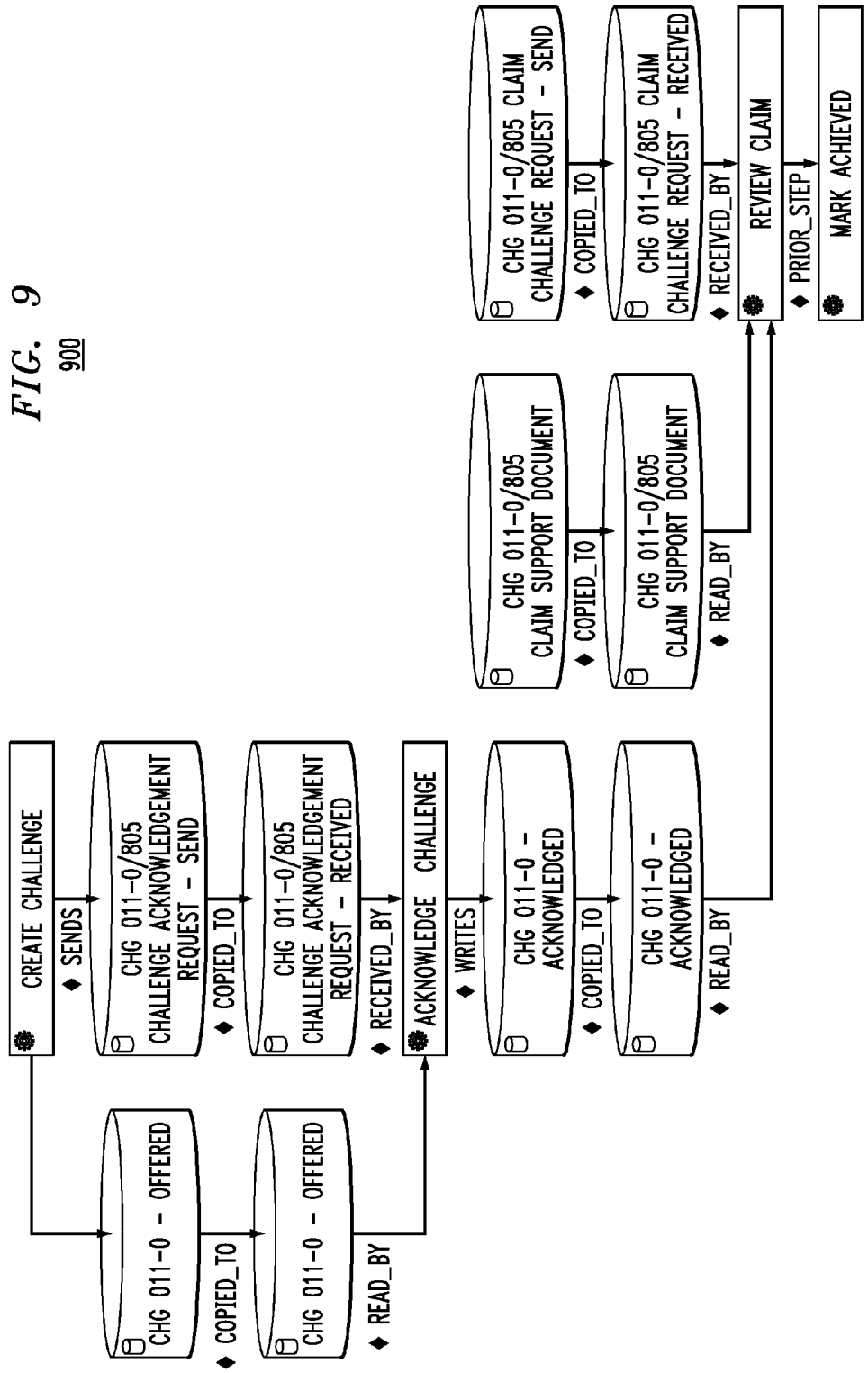
FIG. 9 illustrates an example of extracting workflow information, according to an embodiment of the invention.

Workflow is the sequence of tasks in an enterprise operation and provides for an abstraction or a model for the actual work. It provides an easier way to understand and explain complex processes in visual form. Recall that workflow analyzer 644 depicted in FIG. 6 extracts the sequence of tasks from the provenance graph. The sequence of tasks is retrieved from the provenance graph via query interface 610 by searching for the pedigree of TaskRecords, DataRecords and their relations. FIG. 9 is an example workflow 900 for the enterprise operation which includes not only the sequence of tasks but also the data consumed between the tasks.

Discovering the relationship between two enterprise objects is important to understand the roles and impact of various resources on the operation. An edge connecting the two nodes of a graph is an atomic relation. Referring back to FIG. 4C, as an example, SupportingDocument 478 and ClaimEmail 474 nodes are connected with attachedTo relation edge. The atomic relation reveals that SupportingDocument is attached to the ClaimEmail. More complex relations can be composed by combining the atomic relations.

Figure 10:
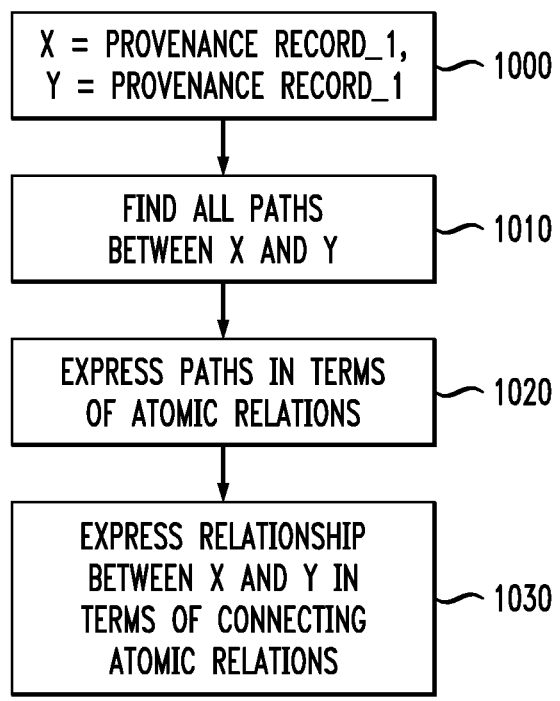
FIG. 10 illustrates a relationship discovery methodology, according to an embodiment of the invention.

FIG. 10 shows the sequence of steps to find the relationship between two provenance records X and Y (1000). The first step is to find all paths between X and Y (1010). Once the connecting paths are discovered, the paths are expressed in terms of their atomic relations (1020), and the main relationship is expressed as the combination of atomic relations (1030).

Figure 11:
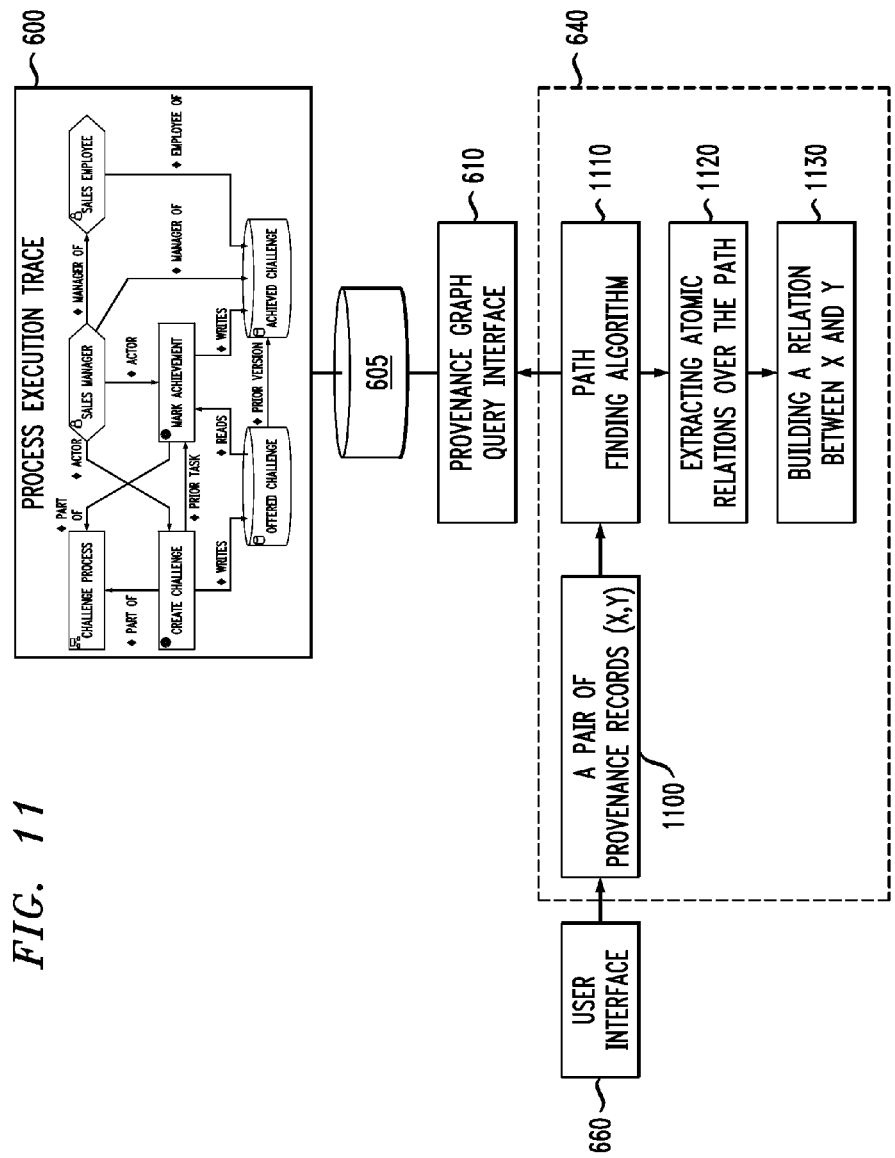
FIG. 11 illustrates a relation discovery subsystem, according to an embodiment of the invention.

FIG. 11 shows how the relation finder subsystem works. Recall that this component is shown in FIG. 6 as relation (path) finder 640.

A pair of provenance records 1100 for which the relationship is sought is entered through user interface 660. One of the path finding algorithms 1110 is used to find the path between the records via the query interface 610. For example, A* and Dijkstra are some of the most frequently used path finding algorithms that may be used. Once the path is found, atomic relations are extracted (1120) and the main relation is built (1130).

Figure 12:
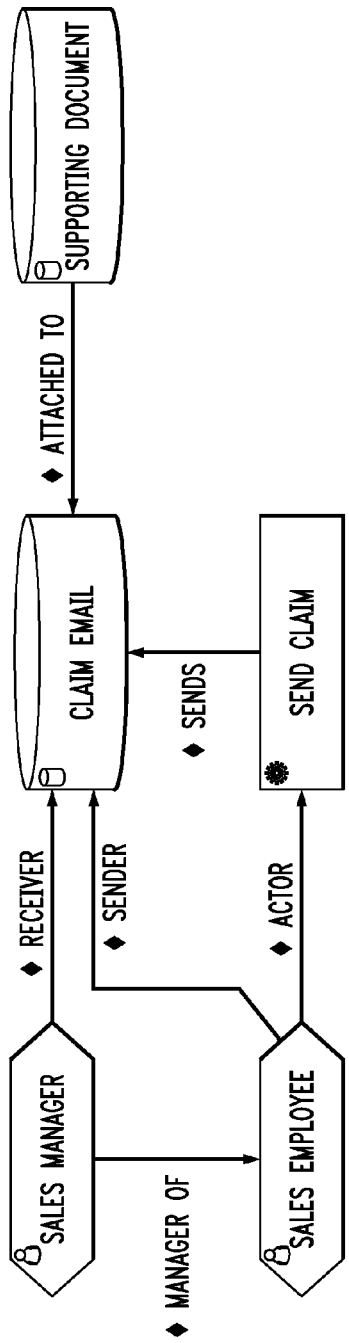
FIG. 12 illustrates an example of finding a relationship between two enterprise objects, according to an embodiment of the invention.

In the example below, a relationship between SalesManager and SupportingDocument depicted in FIG. 12 is sought. Based on the steps of FIG. 11, the following steps are taken:
1. Finding paths between SalesManager and SupportingDocument
   First path: SalesManager—ClaimEmail—SupportingDocument
   SecondPath: SalesManager—SalesEmployee—ClaimEmail—SupportingDocument
2. Atomic Relations for the first path:
   attachedTo(ClaimEmail, SupportingDocument): SupportingDocument is attached to the ClaimEmail
   receiver(SalesManager, ClaimEmail): SalesManager receives the ClaimEmail
3. Building the path from atomic relations in datalog format:
   Relations(SalesManager, SupportingDocument): attachedTo(ClaimEmail, SupportingDocument) AND receiver(SalesManager, ClaimEmail)
4. Discovered Relation: SupportingDocument is attached to the e-mail received by SalesManager The datalog format is known and disclosed in, for example, S Ceri et al., "What you always wanted to know about Datalog (and never dared to ask)," IEEE Transactions on Knowledge and Data Engineering 1(1), 1989, pp. 146-66; and Datalog User Manual, John D. Ramsdell of The MITRE Corporation, 2004, the disclosures of which are incorporated by reference herein in their entirety.

Figure 13:
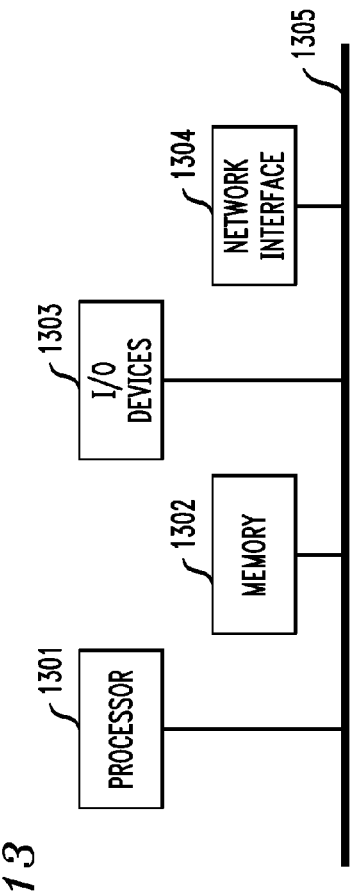
FIG. 13 illustrates a computer system in accordance with which one or more components/steps of the techniques of the invention may be implemented, according to an embodiment of the invention.

Lastly, FIG. 13 illustrates a computer system in accordance with which one or more components/steps of the techniques of the invention may be implemented. It is to be further understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computer system shown in FIG. 13 may represent one or more of the components/steps shown and described above in the context of in FIGS. 1 through 12. For example, the computer system may be used to implement one or more of the components of the information extraction system depicted in FIG. 6.

The computer system may generally include a processor 1301, memory 1302, input/output (I/O) devices 1303, and network interface 1304, coupled via a computer bus 1305 or alternate connection arrangement.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard disk drive), a removable memory device (e.g., diskette), flash memory, etc. The memory may be considered a computer readable storage medium.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of extracting information regarding an execution of an enterprise process, comprising the steps of:
   probing various hardware and software components of a computing platform executing an enterprise process to collect event data associated with actual end-to-end execution traces of the enterprise process;
   automatically transforming the collected event data into provenance data by mapping the collected event data to a provenance data model, wherein the provenance data model comprises a list of enterprise objects to he probed and defines correlation rules between data items of the collected event data, and wherein the provenance data provides an indication of a lineage of one or more data items of the collected event data;
   processing the provenance data to generate a provenance graph that provides a visual representation of the generated provenance data, wherein nodes of the provenance graph represent records associated with the collected data items and edges of the provenance graph represent relations between the records, wherein the records include data object records, task records, and process records that represent data objects, tasks and processes corresponding to the collected event data associated with the actual end-to-end execution traces of the enterprise process; and executing an automated graph analysis process to analyze at least a portion of the generated provenance data from the provenance graph to extract information about the execution of the enterprise process;

wherein the probing, transforming, processing and executing steps are performed by a processor executing computer program code.

2. The method of claim 1, wherein the graph analysis further comprises determining one or more process patterns in the enterprise process.

3. The method of claim 2, wherein the one or more process patterns comprise one or more common process patterns.

4. The method of claim 2, wherein the one or more process patterns comprise one or more custom process patterns.

5. The method of claim 4, wherein a custom pattern is specified by a user through a user interface and a pattern search function is invoked to search for this particular pattern.

6. The method of claim 1, wherein the graph analysis further comprises performing a statistical analysis on at least a portion of the generated provenance data.

7. The method of claim 1, wherein the graph analysis further comprises predicting a subsequent evolution of the enterprise process.

8. The method of claim 1, wherein the graph analysis further comprises discovering an actual workflow from at least a portion of the generated provenance data.

9. The method of claim 1, wherein the graph analysis further comprises discovering a relation between two enterprise objects that are part of different nodes that are not connected by an edge in the provenance graph.

10. The method of claim 1, wherein the graph analysis further comprises discovering one or more human resources behind the execution of non-automated tasks and their roles in the enterprise process.

11. The method of claim 1, wherein the graph analysis further comprises discovering a list of one or more executed tasks, orders of the tasks, durations of the tasks and outputs of the tasks in the enterprise process.

12. The method of claim 1, wherein the graph analysis further comprises discovering one or more artifacts and their pedigree in the enterprise process.

13. Apparatus for extracting information regarding an execution of an enterprise process, comprising:
a memory; and
a processor coupled to the memory and configured to:
probe various hardware and software components of a computing platform executing an enterprise process to collect event data associated with actual end-to-end execution traces of the enterprise process;
automatically transform the collected event data into provenance data by mapping the collected event data to a provenance data model, wherein the provenance data model comprises a list of enterprise objects to be probed and defines correlation rules between data items of the collected event data, and wherein the provenance data provides an indication of a lineage of one or more data items of the collected event data;
process the provenance data to generate a provenance graph that provides a visual representation of the generated provenance data, wherein nodes of the provenance graph represent records associated with the collected data items and edges of the provenance graph represent relations between the records, wherein the records include data object records, task records, and process records that represent data objects, tasks and processes corresponding to the collected event data associated with the actual end-to-end execution traces of the enterprise process; and execute an automated graph analysis process to analyze at least a portion of the generated provenance data from the provenance graph to extract information about the execution of the enterprise process.

14. The apparatus of claim 13, wherein the graph analysis further comprises determining one or more process patterns in the enterprise process.

15. The apparatus of claim 14, wherein the one or more process patterns comprise one or more common process patterns.

16. The apparatus of claim 14, wherein the one or more process patterns comprise one or more custom process patterns.

17. The apparatus of claim 13, wherein the graph analysis further comprises performing a statistical analysis on at least a portion of the generated provenance data.

18. The apparatus of claim 13, wherein the graph analysis further comprises discovering an actual workflow from at least a portion of the generated provenance data.

19. The apparatus of claim 13, wherein the graph analysis further comprises discovering a relation between two enterprise objects that are part of different nodes that are not connected by an edge in the provenance graph.

20. The apparatus of claim 13, wherein the graph analysis further comprises discovering one or more human resources behind the execution of non-automated tasks and their roles in the enterprise process.

21. The apparatus of claim 13, wherein the graph analysis further comprises discovering a list of one or more executed tasks, orders of the tasks, durations of the tasks and outputs of the tasks in the enterprise process.

22. The apparatus of claim 13, wherein the graph analysis further comprises discovering one or more artifacts and their pedigree in the enterprise process.

23. An article of manufacture for extracting information regarding an execution of an enterprise process, the article comprising a non-transitory computer readable storage medium including, program code which when executed by a computer performs the steps of:
probing various hardware and software components of a computing platform executing an enterprise process to collect event data associated with actual end-to-end execution traces of the enterprise process;
automatically transforming the collected event data into provenance data by mapping the collected event data to a provenance data model, wherein the provenance data model comprises a list of enterprise objects to be probed and defines correlation rules between data items of the collected event data, and wherein the provenance data provides an indication of a lineage of one or more data items of the collected event data;
processing the provenance data to generate a provenance graph that provides a visual representation of the generated provenance data, wherein nodes of the provenance graph represent records associated with the collected data items and edges of the provenance graph represent relations between the records, wherein the records include data object records, task records, and process records that represent data objects, tasks and processes corresponding to the collected event data associated with the actual end-to-end execution traces of the enterprise process; and executing an automated graph analysis process to analyze at least a portion of the generated provenance data from the provenance graph to extract information about the execution of the enterprise process.

* * * * *